Dec. 19, 1939.  P. FISCHER ET AL  2,183,907
WINDSHIELD DEFROSTER
Filed Oct. 7, 1937

INVENTOR
Peter Fischer and
Theodore Fischer
By Ralph Burch
Attorney

Patented Dec. 19, 1939

2,183,907

UNITED STATES PATENT OFFICE 2,183,907

WINDSHIELD DEFROSTER

Peter Fischer and Theodore Fischer, Lockwood, Saskatchewan, Canada

Application October 7, 1937, Serial No. 167,845

1 Claim. (Cl. 20—40.5)

This invention relates to improvements in an automobile windshield defroster. Its primary object being to provide a monolithic double windshield having heating means associated therewith.

A further object of the invention is to provide a double windshield of monolithic construction having a space therebetween wherein a vacuum is created and having a heating medium conduit recessed in the edges of the glass to transmit heat to the space and throughout the glass.

A still further object of the invention is to provide means controlling the distribution of the heating medium through the conduit means. The heating medium may be hot air or water drawn from the automobile engine and carried through suitable pipes or an electrical heating element may be substituted therefor to produce the desired object.

With these and other objects in view that may appear while the description proceeds, the invention consists in the novel construction and arrangement of parts as hereinafter more specifically set forth, claimed and shown in the accompanying drawing forming part of this application and in which:

Figure 1:
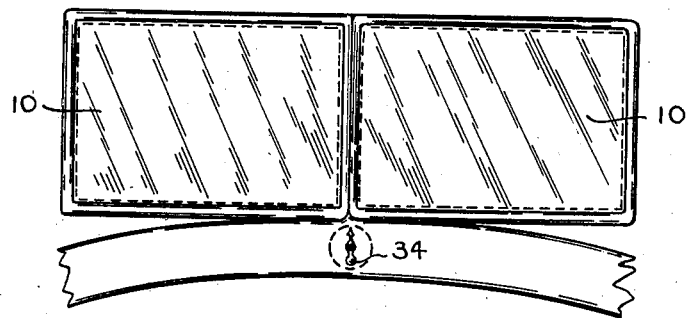
Fig. 1 is a general view of a double windshield showing the control on the dash.
Figures 2, 3:
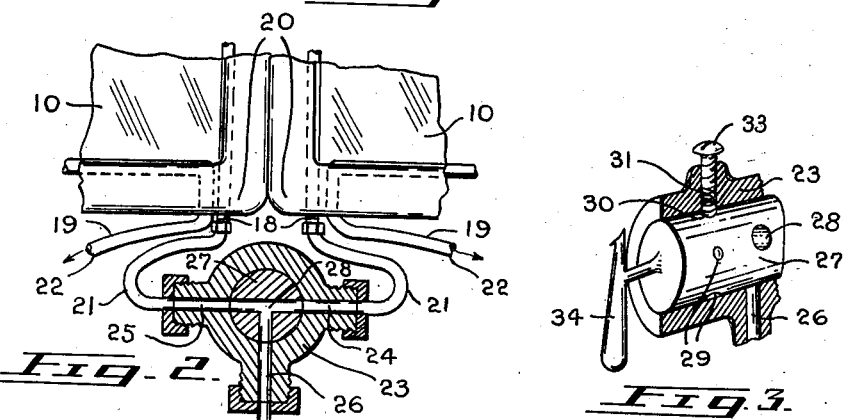
Fig. 2 is a sectional view showing details of the control means.
Fig. 3 is a partial sectional view of the valve.
Figures 4, 5:
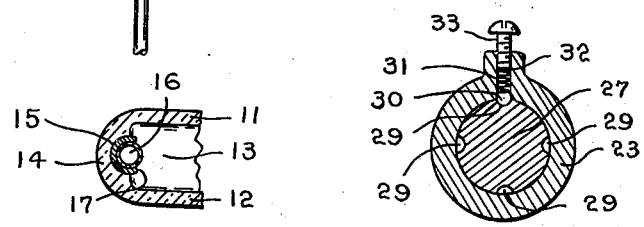
Fig. 4 is a further sectional view of the valve.
Fig. 5 is a fragmentary section of the windshield showing the recessed conduit.
Figure 6:
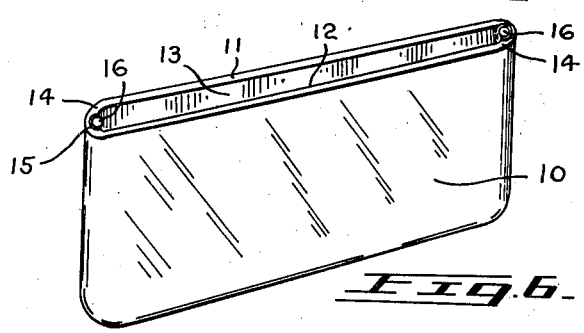
Fig. 6 is a perspective view showing the construction of the monolithic double windshield and the recessed conduit means therein.

Referring more in detail to the drawing in which similar reference characters designate corresponding parts throughout the several views it will be seen the invention comprises a windshield 10 formed in two planes 11 and 12 parallel with each other and spaced apart to a predetermined distance to provide a space 13 therebetween. The ends 14 are joined to each other and the whole formed in a monolithic structure. The inside of the edges is recessed as shown at 15 to provide accommodation for the heating conduit 16. Said conduit may be of any suitable tubular material and is insulated from the glass by an insulation strip 17 of asbestos or other material.

The conduit terminals 18 and 19 project from the lower corner 20 of the windshield to be connected to feed and return conduits 21 and 22. These are preferably of flexible material to allow for vibration and to permit opening of the windshield in the customary way. The upper edge of the windshield is left open for assembly purposes after which it is closed and the air extracted from the vacuum space and the same sealed up.

The valve is of the rotary core type and comprises a shell 23, having diametrically opposed outlets 24 and 25 and an inlet 26 centrally disposed therebetween. The core 27 is constructed with a T shaped duct 28 therein arranged to register with the said shell outlets. Four recesses 29 are spaced equidistant in the periphery of the core in alignment with the ducts. A ball 30 actuated by a spring 31 engages the said recesses when the ducts are in alignment with the outlets. Said spring is retained in its aperture 32 by a screw 33 threadably mounted therein and by means of which the tension of the spring is adjusted. A pointer handle 34 is formed on the core and constitutes means to manipulate the valve. From the construction of the valve it will be seen the heating medium may be directed to one or both of a pair of windshields as shown in Fig. 1, or only to one of them, or the heat may be entirely shut off as desired.

Where an electrically operated device is constructed the heating element will be enclosed in the conduits 16 and the valve will be substituted by a switch to include one or both in the circuit.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of co-operating parts may be resorted to within the scope of what is claimed without departing from the spirit of the invention.

We claim:

A windshield comprising a double wall glass pane of monolithic construction, said walls being spaced apart to provide a space between the walls from which the air is extracted to produce a vacuum, the inner edges of said pane being rounded and having a channel formed therein, and a conduit extending around the inner edges of said pane and seated in the channel, through which a heating medium is adapted to pass for heating the walls of the pane.

PETER FISCHER.
THEODORE FISCHER.